United States Patent [19]

Haley et al.

[11] Patent Number: 5,621,613
[45] Date of Patent: Apr. 15, 1997

[54] APPARATUS FOR DISSIPATING HEAT IN A HINGED COMPUTING DEVICE

[75] Inventors: Kevin Haley, San Jose, Calif.; Mostafa Aghazadeh; Hong Xie, both of Chandler, Ariz.

[73] Assignee: Intel Corporation, Santa Clara, Calif.

[21] Appl. No.: 683,022

[22] Filed: Jul. 15, 1996

Related U.S. Application Data

[63] Continuation of Ser. No. 441,969, May 16, 1995, abandoned.

[51] Int. Cl.$^6$ ............................................. H05K 7/20
[52] U.S. Cl. ................ 361/687; 62/259.2; 165/104.33; 361/700; 364/708.1
[58] Field of Search ........................ 364/708.1; 257/714, 257/715; 62/259.2; 174/252, 16.3, 15.2; 165/104.22, 104.26, 104.33, 86, 80.3, 80.4, 185; 361/687–699, 700, 704, 707, 717–719

[56] References Cited

U.S. PATENT DOCUMENTS

| | | | |
|---|---|---|---|
| 4,084,213 | 4/1978 | Kirchner | 361/384 |
| 4,730,364 | 3/1988 | Tat-Kee | 16/337 |
| 4,980,848 | 12/1990 | Griffin | 361/687 |
| 4,993,482 | 2/1991 | Dolbear et al. | |
| 5,117,901 | 6/1992 | Cullimore | |
| 5,129,448 | 7/1992 | Holmbert, Jr. et al. | |
| 5,195,213 | 3/1993 | Ohgami et al. | |
| 5,237,486 | 8/1993 | LaPointe | 361/681 |
| 5,313,362 | 5/1994 | Hatada | 361/709 |
| 5,383,340 | 1/1995 | Larson et al. | 62/259.2 |
| 5,424,913 | 6/1995 | Swindler | 361/687 |

FOREIGN PATENT DOCUMENTS 4048693  2/1992  Japan ............................... 361/687

*Primary Examiner*—Gerald P. Tolin
*Attorney, Agent, or Firm*—Blakely, Sokoloff, Taylor & Zafman

[57] ABSTRACT

A heat transfer apparatus providing thermal coupling between a first and a second hinged member. The first hinged member is a first computer housing member, and the second hinged member is a second computer housing member. The first and the second computer housing members are rotatably attached allowing pivotal motion along an axis substantially parallel to the first edge. A first embodiment has a spiraled heat transfer element with a inner edge thermally coupled to a heat conductive mounting element mounted along the first edge of the first computer housing member. The spiraled heat transfer element forms at least one turn around the heat conductive mounting element and has outer edge affixed to the second computer housing member. A second embodiment provides heat transfer between the first and second computer housing members through the gudgeon and the pintle of the hinge.

25 Claims, 2 Drawing Sheets

U.S. Patent    Apr. 15, 1997    Sheet 1 of 2    5,621,613
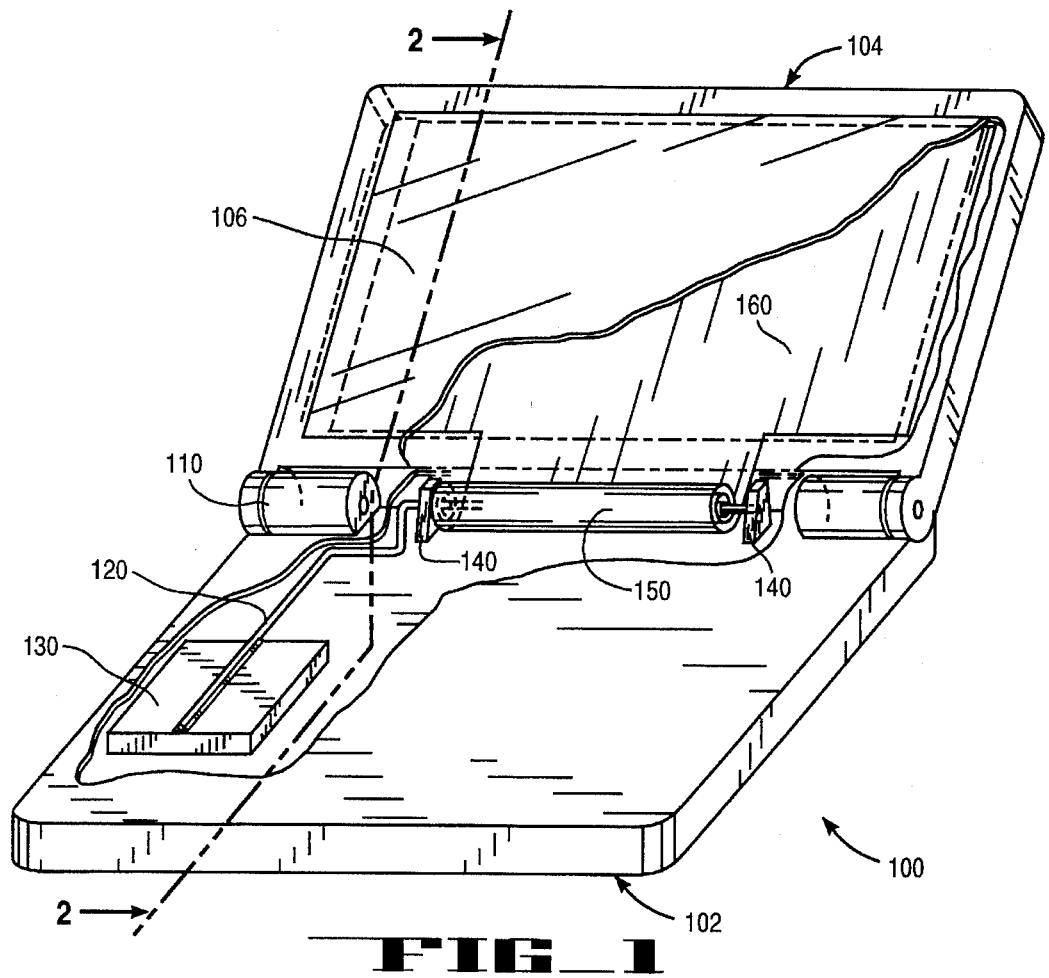
FIG_1
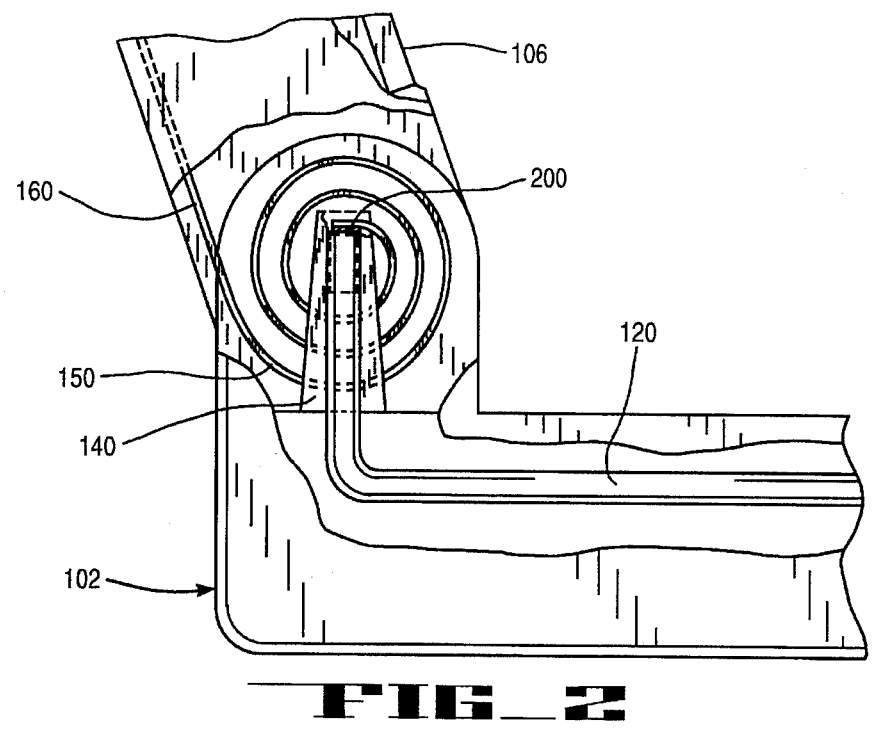
FIG_2

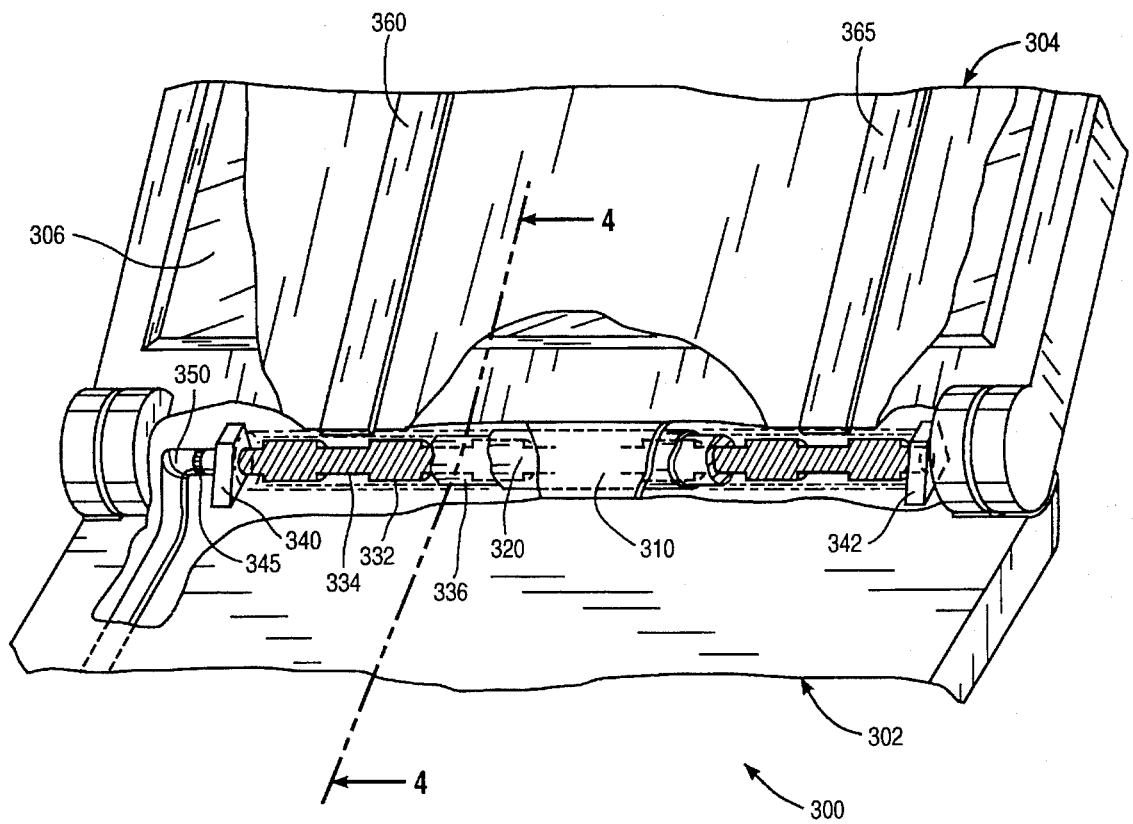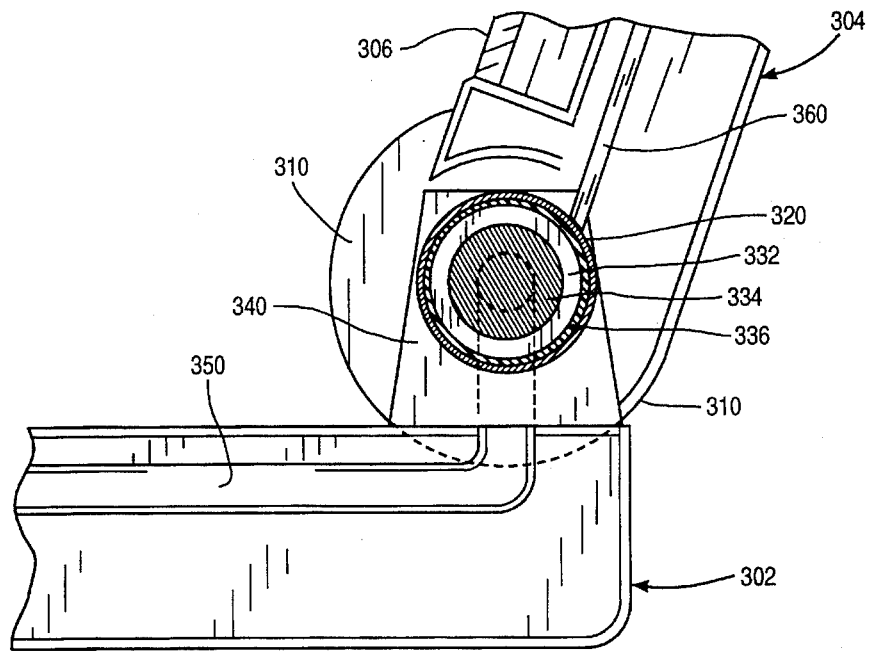

APPARATUS FOR DISSIPATING HEAT IN A HINGED COMPUTING DEVICE

This is a continuation of application Ser. No. 08/441,969, filed May 16, 1995, now abandoned.

FIELD OF THE INVENTION

The present invention pertains to the field of the removal of heat from electronic components. More particularly, this invention relates to the removal of heat from a first computer housing member to a rotatably attached second computer housing member.

BACKGROUND OF THE INVENTION

Higher levels of integration and improved processing technology produce increasingly complex integrated circuits. These new generations of integrated circuits often operate at higher frequencies and generate more heat than their predecessors. Typically, heat sinks, fans, and heat pipes are employed to dissipate heat from integrated circuits and other electronic components. Increases in heat generation are often accommodated by simply increasing the quantity or size of these heat dissipation elements. The relatively small size of a portable computing device, however, complicates heat dissipation by limiting airflow, crowding heat generating components, and reducing the space available for heat dissipation devices.

A portable computing device typically includes two computer housing members which are rotatably coupled by a hinge. The first member, a computer base, usually has an input device such as a keyboard or a touchpad as well as a number of electronic components. Integrated circuits with the highest clock frequency are typically located in close proximity to each other within the computer base. Accordingly, there is often a region in the base having a level of heat generation greater than that of the rest of the computer.

Since the computer base size is generally kept to a minimum, and the computer base contains both the input device and numerous other electronic components, there may be inadequate space to dissipate enough heat to keep the electronic components within their acceptable range of operating temperatures. Heat dissipation through the bottom of the base is limited because the computer is usually operated on a relatively flat surface. Also, the input device (e.g. keyboard) can limit the heat flow through the top of the base. Further, since a horizontal surface is less effective at producing convective air currents to dissipate heat than is a vertical surface, the traditional horizontal operating position adds to the difficulty of dissipating heat from the computer base.

The second member, the computer display, is typically in a substantially vertical position during computer operation. The display contains an output device such as a screen and some additional computer circuitry. In most computers, the screen and the other circuitry in the display do not generate more heat than can be dissipated given the surface area available and the relatively vertical position of the display. Thus, additional heat from the base could be dissipated in the display if transferred from the base to the display.

The main difficulty in transferring heat between the base and the display is that many efficient heat conductors such as heat pipes are not sufficiently flexible to accommodate the repetitive motion expected between the hinged base and display of a computing device. A traditional hinge, having a first and a second hinged surface each having a cylindrical portion forming a gudgeon (each gudgeon defining socket for the pin or pintle of the hinge) and a pintle (the pin on which the gudgeons turn) can transfer heat between the two hinged surfaces; however, the geometry and heat transfer capacity of a traditional hinge are not well suited for transferring heat between the base and display of a portable computing device. In a portable computing device, the region of highest heat generation is usually not immediately adjacent to, and therefore cannot be directly coupled to, a traditional hinge, thus reducing the ability to thermally couple the region of highest heat generation in the base to the display.

Heat transfer through a hinge is improved by increasing the hinge mass and by using more expensive, highly conductive materials, however, the increased weight and cost are seldom justified. Such a prior art technique is discussed in "Low Torque Hinged Heat Transfer Joint" (U.S. Pat. No. 5,129,448) which proposes heat transfer from a first to a second flat surface of a hinge using numerous interleaved fingers having a special heat conductive low friction coating allowing maximal surface area contact. This technique which transfers heat between the rotatable flat surfaces of a hinge may be geometrically incompatible and undesirably heavy and expensive for use in some portable computing devices.

SUMMARY OF THE DISCLOSURE

The present disclosure describes a heat transfer apparatus providing thermal coupling between a first and a second hinged member. The first hinged member is a computer housing member (e.g. base) having a first edge, and the second hinged member is a second computer housing member (e.g. display). The first and the second computer housing members are rotatably attached allowing pivotal motion along an axis substantially parallel to the first edge. The heat transfer apparatus includes a heat conductive mounting element which is mounted along the first edge of the first computer housing member. The heat conductive mounting element is thermally coupled to an end section of a spiraled heat transfer element which forms at least one turn around the heat conductive mounting element. A second end section of the spiraled heat transfer element is affixed to the second computer housing member.

The present disclosure also describes a thermally conductive hinging apparatus in a computer having a base with a base edge and a display housing with a display housing edge. An electronic component in the computer base is thermally coupled to one end of a heat transfer element. The other end of the heat transfer element ends at or alternately defines the pintle. A gudgeon is mounted along a pivotal axis which is substantially parallel to the base edge and the display housing edge. A pintle is substantially enclosed in the gudgeon, and the pintle and the gudgeon provide the display housing and the base with relative axial rotation about the pivotal axis. The pintle may have interleaved sections with different diameters to limit lateral motion of a grease distributed in the gudgeon. A second heat transfer element affixed to the display housing is thermally coupled through the gudgeon and the pintle to the other end of the first heat transfer element.

BRIEF DESCRIPTION OF THE FIGURES

The present invention is illustrated by way of example and not limitation in the figures of the accompanying drawings.

FIG. 1 is an elevation view of a computer with a partial cutaway section which incorporates an embodiment of the present invention.

FIG. 2 is a partial cross sectional elevation view of the computer of FIG. 1 taken through the section lines 2—2 of FIG. 1.

FIG. 3 is a cross sectional elevation view of a computer with a cutaway section which incorporates a second embodiment of the present invention.

FIG. 4 is a partial cross sectional elevation view of the computer of FIG. 3 taken through the section lines 4—4 of FIG. 3.

DETAILED DESCRIPTION OF THE INVENTION

An apparatus for heat dissipation is described. In the following description, numerous specific details are set forth in order to provide a thorough understanding of an embodiment of the present invention. It will be apparent to those skilled in the art that the present invention may be practiced without these specific details.

The present disclosure describes a first embodiment of an apparatus for dissipating heat in a hinged computing device which utilizes a spiraled heat transfer element to transfer heat between a computer base and a display housing. This embodiment is illustrated in FIG. 1 and FIG. 2. An inner edge of the spiraled heat transfer element is thermally coupled to a heat conductive mounting element mounted along a first edge of the computer base. The spiraled heat transfer element forms at least one coil or turn around the heat conductive mounting element and has an outer edge affixed to the computer display. This arrangement allows the spiraled heat transfer element to radially expand and compress during pivotal motion between the computer base and computer display. The heat conductive mounting element is typically thermally coupled to a heat source in the computer base.

A second embodiment illustrated in FIG. 3 and FIG. 4 and described in the present disclosure utilizes the pintle (hinge pin) and the gudgeon (socket for the pintle) to transfer heat from computer base to the computer display. A heat transfer element which is substantially longer than it is wide in the computer base transfers heat from a first end coupled to an electronic component to a second end. Heat is transferred from the second end of this heat transfer element to the computer display through the combination of the pintle and the gudgeon. A heat pipe forms an effective heat transfer element, and either the heat pipe itself or a heat conductive rod can form the pintle of the hinge.

FIG. 1 illustrates a computer utilizing the present invention. This computer nnay be any of a number of hinged computing devices including laptop computers, notebook computers, or hand held computers such as organizers. Computer 100 includes a base 102 and a display housing 104. Hinge 110 attaches an edge of base 102 to an edge of display housing 104 providing pivotal motion along an axis substantially parallel to both edges. Display housing 104 includes a computer screen 106 and a heat dissipation plate 160 located behind computer screen 106.

Computer base 102 includes an electronic component 130 which generates heat, some of which is to be transferred to the heat dissipation plate 160 of display housing 104. Mounting brackets 140 are affixed to base 102 and support a heat pipe 120. In the present embodiment, one end of heat pipe 120 extends into computer base 102 and is thermally coupled to electronic component 130. The electronic component 130 can be an integrated circuit such as a microprocessor or a microcontroller, or any other type of electronic component to which a heat conductor may be thermally coupled. Alternately, the heat pipe 120 may be thermally coupled to a circuit board or a heat sink in the vicinity of one or more electronic components. In the present embodiment, the other end of heat pipe 120 forms a heat conductive mounting element as it extends from mounting brackets 140.

Heat pipe 120 used in the present invention may be any of a variety of commercially available heat pipes. It is desirable to use a bend-once type heat pipe or a heat pipe which is rigidly formed with a bend. This allows heat pipe 120 to extend up from base 102 to the mounting brackets 140. Suitable heat pipes are available from THERMACORE Inc. of Lancaster, Pa. Different geometrical arrangements of the various components involved may allow the use of straight rigid heat pipes.

The heat pipe 120 is constructed to transfer heat from the electronic component 130 to spiraled heat transfer element 150. The heat pipe 120 typically contains a fluid that flows along a wick (not shown) attached to the inner surface of the pipe. Heat is applied to an evaporation section of the heat pipe 120 that is adjacent to the electronic component 130 and removed from a condensation portion of the heat pipe 120 that is coupled to spiraled heat transfer element 150. The heat vaporizes the fluid which creates a pressure differential between the evaporation section and the condensation section of heat pipe 120. The pressure differential pumps the fluid through the wick from the condensation portion to the evaporation portion. The vaporized fluid is then pumped from the evaporation portion back to the condensation portion. The evaporation and condensation portions of heat pipes are generally defined by the direction of heat transfer since most heat pipes allow heat flow in multiple directions.

The spiraled heat transfer element 150 provides thermal transfer between base 102 and display housing 104. The inner edge of spiraled heat transfer element 150 is thermally coupled to heat pipe 120. Spiraled heat transfer element 150 forms at least one radially expanding coil or turn around heat conductive mounting element 120. The outer end of the spiral forms heat dissipation plate 160. Alternately, the outer end of spiraled heat transfer element 150 may be thermally coupled to a separate heat dissipation plate or heat sink. The spiraled heat transfer element of the present embodiment is a strip of copper forming a spiral that extends between mounting brackets 140. Aluminum or other heat conducting materials may also be used.

The number of turns to be used in spiraled heat transfer element 150 is determined by the amount of heat dissipation required, the structural integrity of heat pipe 120 and its mounting arrangement, and the acceptable increase in resistance to closing display housing 104 with respect to base 102. The more turns used in spiraled heat transfer element 150, the less force will be exerted on heat pipe 120 when the display is opened and closed. A larger number of spiral turns similarly minimizes the resistance spiraled heat transfer element 150 contributes when closing the display housing 104. A larger number of turns increases the length of the thermal path from the electronic component 130 to the heat dissipation plate 160, decreasing the amount of heat transferred from the base to the heat dissipation plate 160. Thus, an appropriate number of turns is selected allowing the required amount of heat transfer without causing unacceptable stress on heat pipe 120 and resistance to hinge motion.

FIG. 2 illustrates the attachment of the spiraled heat transfer element 150 to the heat pipe 120. A thermal epoxy 200 is typically used to ensure maximum thermal coupling between the heat pipe 120 and the spiraled heat transfer element 150. The spiraled heat transfer element 150 is affixed to the heat pipe 120, but additional structural support may be gained by attaching the spiraled heat transfer element 150 to the mounting brackets 140. More support to the heat pipe 120 can be provided by using a beam parallel to the heat pipe 120 which extends between the mounting brackets 140.

As can also be seen from FIG. 2, heat dissipation plate 160 lies between the back panel and the front face of the display. In order to allow more dissipation of heat, the back panel of display housing 104 may be vented to allow improved air circulation. As an alternative to using heat dissipation plate 160, one or more heat pipes could be thermally coupled to the outer edge of the spiraled heat transfer element 150. These heat pipes would then extend away from the spiraled heat transfer element 150 to allow dissipation of heat throughout the display housing 104. It may be advantageous to use heat pipes in addition to or rather than a heat dissipation plate as heat pipes generally have a lower thermal resistance and allow heat to be more efficiently transferred over a longer distance.

Thus, one embodiment of the present invention transfers heat from the computer base to a rotatably attached computer display housing using a spiraled heat transfer element.

Another embodiment of the present invention is illustrated in FIG. 3, in which heat is transferred from the computer base to the computer display housing through the hinge which allows pivotal motion between the base and the display. Computer 300 will typically be any of a variety of hinged computing devices such as laptop computers, notebook computers, or hand held computers. Base 302 has a base edge substantially aligned with a display housing edge of display housing 304. A gudgeon 320 is mounted along an axis substantially parallel to the display edge and the base edge. In this embodiment, the gudgeon 320 is mounted to the display housing 304, and a gudgeon housing 310 partially encloses the gudgeon 320. A pintle 332 substantially enclosed within the gudgeon 320 and supported by mounting brackets 340 and 342 allows pivotal motion between the display housing 304 and the base 302. Pintle 332 has a first diameter and has interleaved sections of a second smaller diameter such as pintle section 334 in order to keep thermal grease 336 distributed throughout the hinge. In this embodiment, the pintle 322 is a metal rod which extends through the mounting bracket 340 and is coupled through a thermal bond 345 to heat pipe 350. Any suitable thermal bond may be used, including a thermal epoxy, a mechanical coupling, or both.

Heat pipe 350 extends from the end of pintle 332 down into base 302 where it is thermally coupled to an electronic component, circuit board, heat sink, or other heat source. Alternately, a sufficiently strong heat pipe can itself be the pintle 332 thus eliminating the need for thermal bond 345. That is, a hollow pintle defining an axial bore is used. Whether a heat pipe or a heat conductive rod is used, bearings may be used to reduce friction between the gudgeon and the pintle of the hinge. The transfer of heat through the pintle of the hinge is particularly advantageous in allowing heat transfer with a smaller increase in size and weight than would be expected using a typical prior art hinge. The grease 336 provides good heat conduction and thus heat conduction is not solely dependent on the heat conduction of the bearing surfaces.

Behind screen 306 of display housing 304 lie heat pipe 360 and heat pipe 365 which are thermally coupled to gudgeon 320. An alternate heat dissipation device such as a heat dissipation plate or a combination of heat dissipation devices may be used in display housing 304. Thus, heat generated in base 302 may be dissipated in display housing 304 through the thermal coupling between the gudgeon 320 and pintle 332. While the present embodiment shows the gudgeon mounted on display housing 304, the gudgeon could alternately be mounted on base 302 with the pintle being attached to display housing 304. In this event, heat pipe 350 is thermally connected to the gudgeon and the heat sink or the like in display housing 304 is thermally connected to the pintle.

While the current embodiment shows gudgeon 320 to form a single cylindrical socket for pintle 332, the hinge could also be constructed using a number of separate gudgeon sections. In this arrangement, the connection of one or more gudgeon sections to the base and one or more of the remaining gudgeon sections to the display housing can also improve thermal coupling between the base and the display housing.

FIG. 4 shows a cross sectional view of computer 300 of FIG. 3 which further illustrates the hinge arrangement of the present invention. Heat pipe 350 is shown coming up from base 302 and attaching to pintle 332. The narrow section of pintle 332, pintle section 334, is shown as having a slightly smaller diameter than pintle 332. In the embodiment in which the heat pipe forms the pintle, the heat pipe may also have the sections of varying diameter which help to restrict lateral grease movement. A section of thermal grease 336 is shown to lie between the pintle 332 and the gudgeon 320, but it also generally lies throughout gudgeon 320.

The gudgeon housing 310 which is generally formed as a part of display housing 304 is attached to the gudgeon 320 such that the base and display are permitted to pivot along the axis of pintle 332. For cosmetic reasons, the gudgeon housing 310 may extend beyond mounting bracket 340 perpendicular to the axis of pintle 332. However, as can be seen from FIG. 3, display housing 304 could be rotatably attached to base 302 by attaching display housing 304 to the gudgeon 320 between mounting bracket 340 and mounting bracket 342.

Thus, an electronic component thermally coupled to heat pipe 350 can transfer heat from the base 302 through pintle 332 and gudgeon 320 to the pivotally attached display housing 304 where it may be distributed and dissipated using heat pipe 360 and heat pipe 365.

What is claimed is:

1. A heat transfer apparatus providing thermal coupling between an electronic component in a first member having a first edge and a second member rotatably attached to the first member allowing pivotal motion along an axis substantially parallel to the first edge, comprising:

a heat conductive mounting element affixed along the first edge of the first member and thermally coupled to the electronic component; and a spiraled heat transfer element with an inner edge thermally coupled to the heat conductive mounting element and an outer edge affixed to the second member, the spiraled heat transfer element forming at least one full continuously radially expanding turn around the heat conductive mounting element.

2. The heat transfer apparatus of claim 1 wherein the first member is a first computer housing member and the second member is a second computer housing member.

3. The heat transfer apparatus of claim 2 wherein the first computer housing member is a computer base containing an electronic component, the second computer housing member is a computer display housing, and the heat conductive mounting element is thermally coupled to the electronic component.

4. The heat transfer apparatus of claim 3 wherein the heat conductive mounting element is a heat pipe which extends into the computer base, providing thermal coupling with the electronic component.

5. The heat transfer apparatus of claim 3 wherein the computer display housing includes a heat dissipation plate thermally coupled to the outer edge of the spiraled heat transfer element.

6. The heat transfer apparatus of claim 3 wherein the spiraled heat transfer element extends into the computer display housing forming a heat dissipation plate.

7. The heat transfer apparatus of claim 3 wherein the computer display housing includes at least one heat pipe thermally coupled to the spiraled heat transfer element.

8. The heat transfer apparatus of claim 3 wherein the heat conductive mounting element is a thermally conductive rod and the heat transfer apparatus further comprises a heat pipe with a first heat pipe end thermally coupled to the electronic component and a second heat pipe end thermally coupled to a first end of the thermally conductive rod.

9. The heat transfer apparatus of claim 3 wherein the spiraled heat transfer element is made primarily of a material from the group consisting of aluminum and copper.

10. A heat transfer apparatus in a computer with a display housing rotatably attached to a base along a first base edge, the base including an integrated circuit, comprising:

a heat pipe having a heat pipe contact end and a heat pipe contact section, the heat pipe contact end thermally coupled to the integrated circuit, and the heat pipe contact section affixed along the first base edge; and a spiraled heat transfer element with an inner edge thermally coupled to the heat pipe contact section and an outer edge affixed to the display housing, the spiraled heat transfer element forming at least one radially expanding turn around the heat pipe.

11. A heat transfer apparatus in a computer with a computer display housing rotatably attached to a computer base along a first base edge, comprising:

a conductive spiral for providing heat transfer between the computer base and the computer display housing, the conductive spiral attached to the computer display housing and radially compressing and expanding to allow pivotal motion between the computer base and computer display housing; and mounting means securing the conductive spiral to the computer base, the mounting means being affixed to the computer base, the conductive spiral forming at least one full radially expanding turn around the mounting means.

12. The heat transfer apparatus of claim 11 wherein the computer base includes an electronic component and the heat transfer apparatus further comprises a means for transferring heat from the electronic component to the mounting means, the means for transferring being thermally coupled to the mounting means and the electronic component.

13. A thermally conductive hinging apparatus having a first member with a first member edge and a second member with a second member edge, the second member including an electronic component comprising:

a first heat transfer element having a first end and a second end transferring heat between the first end thermally coupled to the electronic component and the second end, the first heat transfer element being substantially longer from the first end to the second end than wide;

a gudgeon mounted along a pivotal axis which is substantially parallel to the first member edge and the second member edge;

a pintle substantially enclosed in the gudgeon the pintle and the gudgeon providing the first member and the second member with relative axial rotation about the pivotal axis, wherein the second end of the first heat transfer element directly in contact with one of the gudgeon an the pintle.

14. A thermally conductive hinging apparatus in a computer having a display housing with a first display housing edge and a base with a first base edge, the base including an electronic component, comprising:

a first heat transfer element having a first end and a second end transferring heat between the first end thermally coupled to the electronic component and the second end, the first heat transfer element being substantially longer from the first end to the second end than wide;

a gudgeon mounted along a pivotal axis which is substantially parallel to the first base edge and the first display housing edge;

a pintle substantially enclosed in the gudgeon, the pintle and the gudgeon providing the display housing and the base with relative axial rotation about the pivotal axis, wherein the second end of the first heat transfer element is directly in contact with one of the gudgeon and the pintle.

15. The hinging apparatus of claim 14 wherein the gudgeon is affixed to the display housing, the pintle is mounted on the base, the second end of the first heat transfer element is thermally coupled to the pintle, and the second heat transfer element is thermally coupled to the gudgeon.

16. The hinging apparatus of claim 15 wherein the first heat transfer element is a first heat pipe.

17. The hinging apparatus of claim 14 wherein the display housing includes a front face and a back panel and a second heat transfer element extends from the gudgeon substantially perpendicular to the pivotal axis between the front face and the back panel.

18. The hinging apparatus of claim 17 wherein the second heat transfer element is at least one heat pipe.

19. The hinging apparatus of claim 17 wherein the second heat transfer element is a heat dissipation plate.

20. The hinging apparatus of claim 15 wherein the pintle is a thermally conductive rod comprising a plurality of first sections with a first diameter interleaved with a plurality of second sections with a second diameter, the gudgeon also containing a thermal grease disposed between the gudgeon and the pintle.

21. A thermally conductive hinging apparatus in a computer having a display housing with a first display housing edge and a base with a first base edge, the base including an electronic component, comprising:

a gudgeon mounted along a pivotal axis which is substantially parallel to the first base edge and the first display housing edge; and a heat pipe with a first end thermally coupled to the electronic component extending to the pivotal axis, the heat pipe forming a bend and including a portion which forms a pintle disposed along the pivotal axis and substantially enclosed in the gudgeon, the pintle and the gudgeon providing relative axial rotation around the pivotal axis between the display housing and the base.

22. The hinging apparatus of claim 21 further comprising a second heat transfer element thermally coupled to the gudgeon and affixed to the display.

23. The hinging apparatus of claim 22 wherein the display includes a front face and a back panel, and the second heat transfer element extends from the gudgeon substantially perpendicular to the pivotal axis between the front face and the back panel of the display.

24. The hinging apparatus of claim 23 wherein the second heat transfer element is at least one heat pipe.

25. The hinging apparatus of claim 23 wherein the second heat transfer element is a heat dissipation plate.

* * * * *

UNITED STATES PATENT AND TRADEMARK OFFICE
CERTIFICATE OF CORRECTION

PATENT NO. : 5,621,613
DATED : April 15, 1997
INVENTOR(S) : Haley et al.

It is certified that error appears in the above-identified patent and that said Letters Patent is hereby corrected as shown below:

In column 3 at line 53 delete "nnay" and insert --may--

In column 8 at line 10 insert --is-- following "element" and prior to "directly"

Signed and Sealed this

Fifth Day of August, 1997

*Attest:*

BRUCE LEHMAN

*Attesting Officer*   *Commissioner of Patents and Trademarks*